(No Model.)
H. C. DEANE.
KNIFE OR SICKLE GRINDER.
No. 524,963. Patented Aug. 21, 1894.
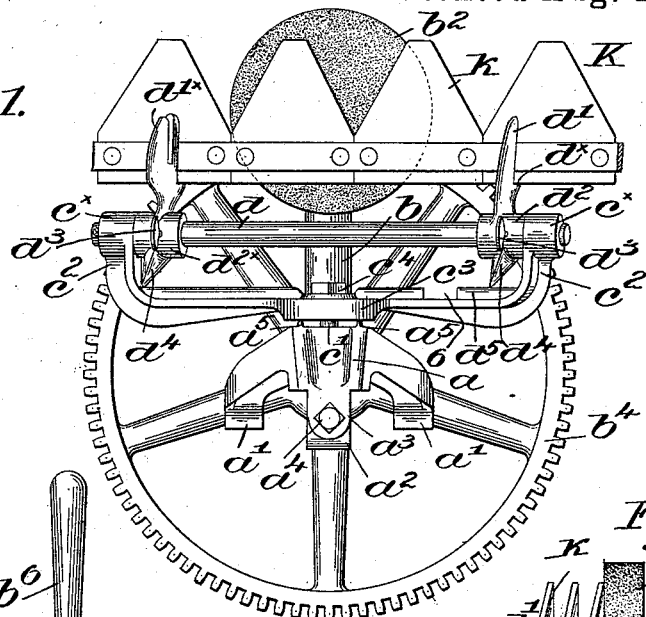
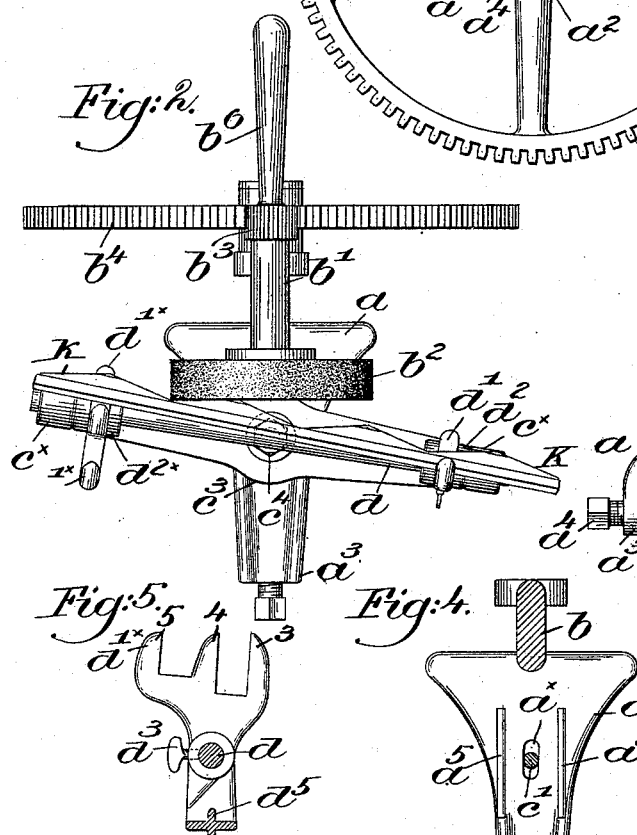
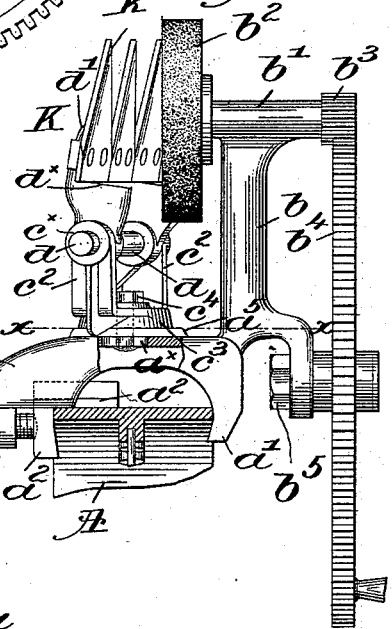
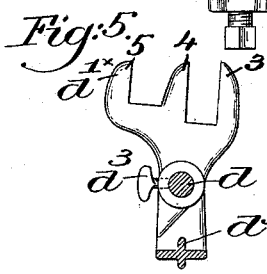
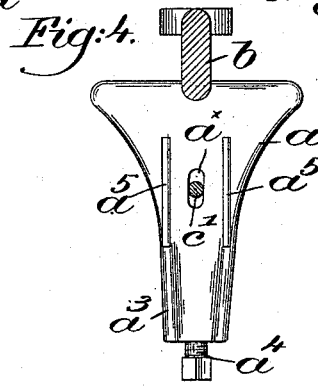
Witnesses.
Fred S. Greenleaf.
Thomas J. Drummond.
Inventor:
Herbert C. Deane
by Crosby Gregory
attys

UNITED STATES PATENT OFFICE.

HERBERT C. DEANE, OF FITCHBURG, MASSACHUSETTS, ASSIGNOR OF ONE-HALF TO SAMUEL W. SAWYER, OF SAME PLACE.

KNIFE OR SICKLE GRINDER.

SPECIFICATION forming part of Letters Patent No. 524,963, dated August 21, 1894.

Application filed May 2, 1894. Serial No. 509,802. (No model.)

*To all whom it may concern:*

Be it known that I, HERBERT C. DEANE, of Fitchburg, county of Worcester, State of Massachusetts, have invented an Improvement in Knife or Sickle Grinders, of which the following description, in connection with the accompanying drawings, is a specification, like letters and figures on the drawings representing like parts.

This invention has for its object the production of a machine for dressing and grinding mowing machine and harvester knives and sickles, the machine being durable, light, simple in construction, and easily and quickly adjusted to grind various bevels, one adjustment for the blade being sufficient for all the cutting teeth thereon.

In accordance therewith my invention consists, in a grinding machine, of a base plate provided with a clamp to secure it to a desired support, a standard on the base plate, and a grinding disk and its driving mechanism carried by said standard, combined with a carrier mounted upon the base plate, and adapted to slide thereon toward or from the face of the grinding disk, means to hold it in adjusted position, and a rock-shaft mounted loosely in bearings of said carrier, and provided with independent finger rests to receive and position the cutter bar having the blades or sections to be ground, substantially as will be described.

Other features of my invention will be hereinafter described and particularly pointed out in the claims.

Figure 1 represents in front elevation a grinding machine embodying my invention. Fig. 2 is a plan view of the apparatus shown in Fig. 1. Fig. 3 is an end view thereof, looking to the left Fig. 1. Fig. 4 is a detail taken below the line $x$—$x$, Fig. 3, and Fig. 5 shows rest $d'^x$ detached.

In Figs. 1 to 3 inclusive, I have shown a cutter bar K in the guides, to be described, in position to have the cutting teeth ground.

As herein shown, I have provided a base-plate $a$ with downturned stationary lugs $a'$, and an adjustable clamping block $a^2$ co-operating therewith, mounted upon a set screw $a^4$ extended through an ear $a^3$ of the base plate, the lugs and block forming a clamp to secure the base plate and parts supported thereon to the rim of one of the wheels, as A, Fig. 3, of the mowing or other cutting machine, or the base plate may be secured to any other desired support. The inner or engaging faces of the lugs and the movable block are preferably slightly beveled, as shown in Fig. 3, to more securely grip the object to which they are applied. A standard $b$ rises from the base plate $a$, and is provided with a stationary bearing $b'$ for the shaft of a grinding disk $b^2$, the outermost end of the shaft having a small pinion $b^3$ thereon, in engagement with a large gear $b^4$ mounted upon a stud $b^5$ secured to the base plate. The gear $b^4$ has a handle $b^6$ thereon, whereby it may be operated to impart very rapid rotation to the grinding wheel or disk $b^2$ through the small pinion $b^3$ on its shaft. The grinding disk $b^2$ may be composed of any suitable grinding material, such as emery, corundum or other suitable abrasive substance, fixed upon suitable wooden or other disks, adapted to be secured upon the end of the pinion shaft.

The top of the base plate $a$ is longitudinally slotted at $a^x$, see Figs. 3 and 4, to receive therein a threaded bolt $c'$, extended into a carrier $c$, herein shown as yoke-like in shape and having bearings $c^x$ in its arms or upturned extremities $c^2$, clearly shown in Figs. 1 and 3, for a rock-shaft or rod $d$.

The top of the base plate has ribs $a^5$ on which rests and slides the hub-like part $c^3$ of the carrier, the threaded end of the bolt $c'$ projecting through the hub $c^3$ and through a slot in the base and receiving upon it a set nut $c^4$, rotation of the set nut in one or the other direction permitting or preventing movement of the carrier $c$ relative to the base plate, whether such movement be rotative or swinging about the bolt $c'$, or bodily with the bolt, longitudinally over the base plate. By means of the swinging and sliding movements of the carrier it can be set at various angles to the flat face of the grinding disk according to the bevel to be given to the sides of the cutter blades of the cutter bar, and it can be set nearer to or farther from the plane of such disk face, so that any desired bevel may be given to the edges of the cutter blades.

The rock-shaft $d$ receives upon it the hubs $d^2$, $d^{2\times}$ of finger rests $d'$, $d'^{\times}$, set screws $d^3$ securing said hubs upon said rock-shaft in adjusted position, preventing lateral or rotative movement of the guides on the rock-shaft. The hubs of the finger rests are provided with ears $d^4$, which act as stops to bear against the track $d^5$ of the carrier $c$ to limit the rotative movement of the rock-shaft when the operator wants to swing the cutter away from the grinding wheel or disk $b^2$ to inspect the work.

The rest $d'$ has one finger, see Figs. 1 and 3, and a shoulder $d^{\times}$ to support the cutter bar K, the shoulder being sufficiently wide to permit the back of the cutter bar to be easily moved longitudinally thereon and to be tipped toward the disk $b^2$ and be held there by the operator while he presents the beveled edges of the cutter blades $k$, one after another to the action of the grinding disk.

The finger rest $d'^{\times}$ shown separately in Fig. 5, has three uprights 3, 4, 5, and two supporting surfaces between them.

When the blades of the cutter other than those nearest or at the heel of the said bar are being ground or sharpened, the back of the cutter bar rests on the shoulder between the projections 3 and 4, but when the operator is about to grind the blade or blades nearest the heel of the bar where it is difficult to get the beveled edges of the blades against the disk $b^2$, the operator will then put the cutter bar between the projections 4 and 5, where he may slide or tip it to suit the emergency, and at this time the rest $d'$ may be made inoperative, and to provide for this I have shown the track $d^5$ of the carrier notched as at 6 to let the projection on the hub $d^2$ pass through said notch to thus let the finger rest $d'$ be thrown forward out of the way of the cutter bar being presented to the face of the disk $b^2$.

While the knife is in the guides it may be turned back from the disk in order that the progress of the grinding may be observed, the rock-shaft $d$ permitting such movement, while the ears $d^4$ limit it.

In operation, after the apparatus has been clamped to the wheel or other support, the carrier is adjusted upon the base plate $a$ by means of the bolt $c'$ and set nut $c^4$, until the proper angle with the face of the disk $b^2$ is obtained, corresponding to the beveled sides of the cutter blades $k$, and the cutter-bar K is removed from the machine and placed on the finger rests with the beveled sides of the blades to be ground toward the face of the disk $b^2$. The operator, grasping the cutter bar, swings it toward the disk, which may be rapidly rotated as described, and presents to said disk one side of a tooth to be ground, the bar and blade being moved longitudinally on the rests until one edge of each blade is properly ground. The carrier $c$ is then swung around until the other sides of the blades are properly presented to the disk, and the edges are ground one by one as the cutter bar is moved longitudinally on the rests. The rests are adjusted on the rock-shaft $d$, so that their ears $d^4$ will bear against the track $d^5$ of the carrier $c$.

I claim—

1. In a grinding machine, a base plate provided with a clamp to secure it to a desired support, a standard on the base plate, and a grinding disk and its driving mechanism carried by said standard, combined with a carrier mounted upon the base plate and adapted to slide thereon, toward or from the face of the grinding disk, means to hold it in adjusted position, and a rock-shaft mounted loosely in bearings of said carrier and provided with independent finger rests to receive and position the cutter bar having the blades or sections to be ground, substantially as described.

2. In a grinding machine, a slotted base plate provided with a clamp to secure it to a desired support, a standard on the base plate, and a grinding disk and its driving mechanism carried by said standard, combined with a carrier, a bolt extended through the slotted base plate and connecting the carrier thereto, whereby the latter may be swung upon it as a center or moved bodily upon the plate, and a set nut to hold the carrier in adjusted position, substantially as described.

3. In a grinding machine, a base plate provided with means to secure it to a support, a rigid standard on the plate, a grinding disk carried by the standard, and driving mechanism for said disk, combined with a yoke-like carrier adjustable on the base plate, a rock-shaft mounted therein, and independently adjustable finger rests on said rock-shaft, substantially as described.

4. In a grinding machine, a base plate provided with means to secure it to a support, a standard, a grinding disk carried by the standard, and driving mechanism for the disk, combined with a carrier adjustably mounted on the base plate, a rock-shaft mounted in said carrier, and finger rests mounted on said rock shaft, and having hubs provided with stops, and a co-operating track to limit the amount of rotation of the rock-shaft, substantially as described.

5. A grinding disk, a standard having a bearing therefor, a base plate, and a carrier mounted adjustably on said base plate and adapted to be tipped thereon to gain the desired angular presentation to the disk of the beveled edge of a cutter blade to be ground, and a rock-shaft mounted on said carrier, and provided with finger rests having stops, combined with a track on said carrier notched as described to enable a stop of one of said rests to pass across said track, substantially as described.

In testimony whereof I have signed my name to this specification in the presence of two subscribing witnesses.

HERBERT C. DEANE.

Witnesses:
CHARLES F. BAKER,
EDITH E. CHAPMAN.